United States Patent
Paranjpe et al.

(10) Patent No.: US 10,533,862 B1
(45) Date of Patent: Jan. 14, 2020

(54) BIASING MAP MATCHED TRAJECTORIES BASED ON PLANNED ROUTE INFORMATION

(71) Applicant: Uber Technologies, Inc., San Francisco, CA (US)

(72) Inventors: Rohan Abhay Paranjpe, San Francisco, CA (US); Seth Harris Rubin, Thornhill (CA); Joseph Kelly Barker, Portland, OR (US); Jintao Guan, San Francisco, CA (US); Karan Rajen Parikh, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/203,600

(22) Filed: Nov. 28, 2018

(51) Int. Cl.
*G01C 21/30* (2006.01)
*G01C 21/34* (2006.01)

(52) U.S. Cl.
CPC ......... *G01C 21/30* (2013.01); *G01C 21/3446* (2013.01)

(58) Field of Classification Search
CPC ............................ G01C 21/30; G01C 21/3446
See application file for complete search history.

(56) References Cited

U.S. PATENT DOCUMENTS

| | | | | |
|---|---|---|---|---|
| 6,028,550 | A * | 2/2000 | Froeberg | G01C 21/28 342/357.29 |
| 8,078,338 | B2 * | 12/2011 | Pack | G05D 1/0061 701/1 |
| 8,521,352 | B1 * | 8/2013 | Ferguson | G05D 1/0274 701/25 |
| 9,359,018 | B2 * | 6/2016 | Lagassey | G07C 5/008 |
| 9,900,747 | B1 * | 2/2018 | Park | H04W 4/029 |
| 10,394,245 | B2 * | 8/2019 | Li | B60W 30/095 |
| 2010/0256836 | A1 * | 10/2010 | Mudalige | G08G 1/163 701/2 |
| 2011/0196817 | A1 * | 8/2011 | Pryakhin | G01C 21/26 706/14 |
| 2013/0117321 | A1 * | 5/2013 | Fischer | G06F 16/21 707/792 |
| 2014/0350763 | A1 * | 11/2014 | Granato | B60W 50/0097 701/22 |
| 2015/0300827 | A1 * | 10/2015 | Malalur | G01C 21/30 701/410 |
| 2015/0345967 | A1 * | 12/2015 | Meuleau | G01C 21/3453 701/25 |

(Continued)

*Primary Examiner* — Babar Sarwar
(74) *Attorney, Agent, or Firm* — Fenwick & West LLP

(57) ABSTRACT

A transport service system identifies a map matched trajectory for a transport vehicle based on planned route information and location data associated with a trip. The system receives planned route information and location data for a transport vehicle. For each location data point, the transport service system identifies a set of candidate road segments. Sequential pairs of candidate road segments represent transitions. The system uses a map of the corresponding area to calculate a transition probability, the likelihood of traversing from the first candidate road segment to the second candidate road segment. The system identifies transitions that correspond to the planned route and adjusts the transition probabilities based on the identified planned route transitions. Based on the adjusted probabilities, the transport service system determines a most-likely traversed path for the transport vehicle.

20 Claims, 7 Drawing Sheets

(56) References Cited

U.S. PATENT DOCUMENTS

| | | | |
|---|---|---|---|
| 2016/0239983 A1* | 8/2016 | Dorum | G06T 11/20 |
| 2017/0238134 A1* | 8/2017 | Nel | H04W 4/022 |
| | | | 455/456.3 |
| 2018/0004211 A1* | 1/2018 | Grimm | G01C 21/3407 |
| 2018/0143644 A1* | 5/2018 | Li | G05D 1/0221 |
| 2018/0182238 A1* | 6/2018 | Fowe | G08G 1/0129 |
| 2018/0357890 A1* | 12/2018 | Fowe | G08G 1/0112 |
| 2019/0084571 A1* | 3/2019 | Zhu | B60W 10/20 |
| 2019/0147736 A1* | 5/2019 | Camp | G08G 1/0112 |
| | | | 340/905 |
| 2019/0186927 A1* | 6/2019 | Koponen | G01C 21/32 |
| 2019/0204096 A1* | 7/2019 | Cai | G01C 21/32 |

* cited by examiner

BIASING MAP MATCHED TRAJECTORIES BASED ON PLANNED ROUTE INFORMATION

BACKGROUND

This disclosure relates generally to map matched vehicle trajectories, and more specifically to generating accurate map matched vehicle trajectories.

Map matching is the process in which raw location signals, such as global positioning satellite (GPS) coordinates, are "snapped" to the underlying road segments. That is, for a given location signal or for a series of location signals, the map matching process attempts to identify a position on a road or road segment given the map data corresponding to the location signal. The transport service system uses the map matched road or road segments to determine transit information, such as the on-route location of a car on a trip or identifying the location of a vehicle for routing to a destination.

The map matching process may incorrectly identify the road segments actually traveled by a vehicle for a variety of reasons. First, the location signals are typically derived from sensors on a vehicle, which may be affected by interference from buildings, vehicles, weather, and other circumstances which affect the precision of the location signals. Second, the map data used by the transport service system typically associates location coordinates (such as a specific latitude and longitude) with the various road segments. In some cases, the map data may include incorrect location coordinates for a road segment that does not reflect the true coordinates of that road segment in the world. The map data may describe roads that do not actually exist, or there may be existing roads that are not captured by the map data. In addition, the map matching process itself for selecting possible road segments may poorly reflect the actual roads traveled by a vehicle.

SUMMARY

To determine a map matched trajectory that accurately reflects the path taken by a transport vehicle, one example approach identifies a map matched trajectory based at least in part on whether the road segments correspond to the planned route for the transport vehicle.

The transport service system receives location data points from transport vehicles on trips and determines, for candidate road segments corresponding to the location data points, a transition probability associated with the candidate road segments. The transition probability identifies the likelihood that, for a sequential set of candidate road segments, the transport vehicle will move from the current candidate road segment to the next candidate road segment. Based on the determined transition probabilities for sequential sets of candidate road segments, the transport service system can identify a most likely route taken by the transport vehicle on a trip.

For each trip taken by a transport service vehicle, a planned route is generated. The planned route identifies a set of coordinates, transition points, or other location data points for the transport service vehicle to traverse during the trip. The planned route may be optimized for duration, distance, or other factors. Accordingly, it is more likely that the transport service vehicle will follow the road segments corresponding to the planned route. To account for the increased probability, the transport service system identifies the transitions between successive candidate road segments that correspond to the planned route and adjusts the transition probabilities determined for the trip. The transport service system can reduce transition probabilities that do not correspond to the identified planned route transitions or increase transition probabilities that correspond to the identified planned route transitions. In each case, the adjusted probabilities reflect an increased likelihood that the transition associated with the planned route is the actual path traveled by the transport service vehicle.

Based on the adjusted probabilities, the transport service system identifies a most-likely map-matched route. The most-likely map-matched route represents the path that most likely reflects the actual route of the transport vehicle based on the planned route and the received GPS data. A most-likely map-matched route may be identified and updated in real time during a trip. Deviations in the most-likely map-matched route from the planned route can be identified and used by the transport service system to determine that a planned route should be recalculated (e.g., in the case that a transport service vehicle deviates from an original planned route).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
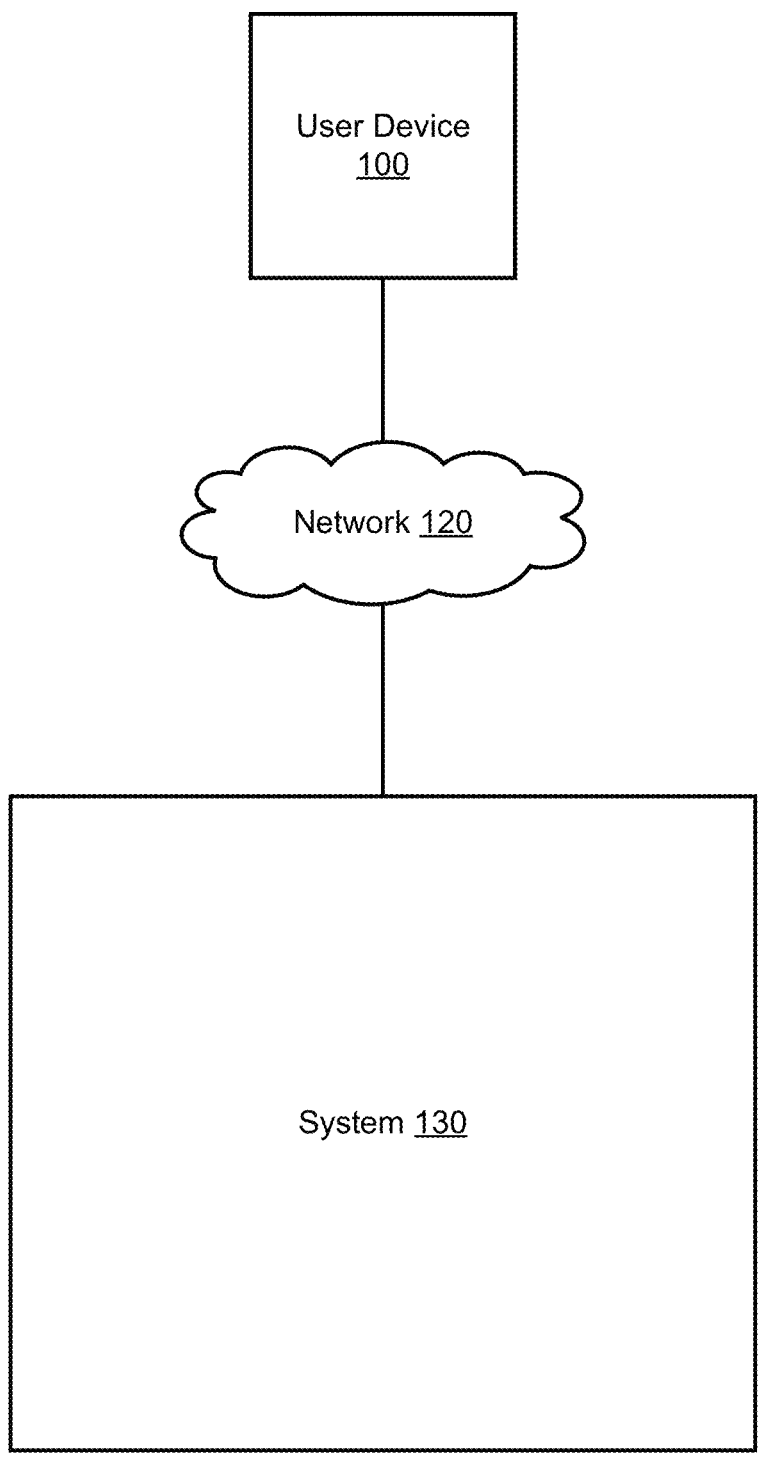
FIG. 1 is a block diagram of a system environment for an online system, in accordance with an embodiment.

FIG. 1 is a high-level block diagram of a system environment for a system 130, in accordance with some embodiments. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. The system 130 may provide routing, direction, and timing information to the user device 100. In some embodiments, the system 130 may coordinate travel, for example, by matching a rider with a provider who can transport the rider, items, or services to a destination requested by a rider.

In some embodiments, the system 130 determines a map matched route from a current or completed trip, the map matched route representing a likely trajectory of travel taken by the transport vehicle. The map matched route is determined based on emission and transition probabilities calculated from a planned route and GPS data associated with the trip. When transition probabilities representing the likelihood of traversing from a first road segment to a second road segment are calculated, the system 130 adjusts the transition probabilities associated with road segments based on whether the road segments are part of the planned route to reflect the likelihood that the transport vehicle will follow the planned route. For example, the system 130 may penalize transition probabilities associated road segments that are not a part of the planned route, making the road segments less likely to be part of the determined map matched route.

Providers and riders may interact with the system 130 through user devices 100. User devices 100 can be personal or mobile computing devices, such as smartphones, tablets, or notebook computers. In some embodiments, the user device 100 executes a client application that uses an application programming interface (API) to communicate with the system 130 through the network 120. A current location of a user device 100 may be designated by a user or detected using a location sensor of the user device 100 (e.g., a global positioning system (GPS) receiver).

User devices 100 may interact with the system 130 through client applications configured to interact with the system 130. The client applications of the user devices 100 can present information received from the system 130 on a user interface, such as a map of the geographic region, the current location of the user device 100, and estimated trip duration. The client application on the user device 100 may be able to determine the current location and provide the current location to the system 130. The user device 100 may provide its "location" as a coordinate, for example as provided by the location sensor on the user device 100. The system 130 may use the location coordinates provided by the user device 100 to determine a specific location with respect to a map and a road or road segment corresponding to the locations provided by the user device 100.

The user devices 100 can communicate with the system 130 via the network 120, which may comprise any combination of local area and wide area networks employing wired or wireless communication links. In some embodiments, all or some of the communication on the network 120 may be encrypted.

Figure 2:
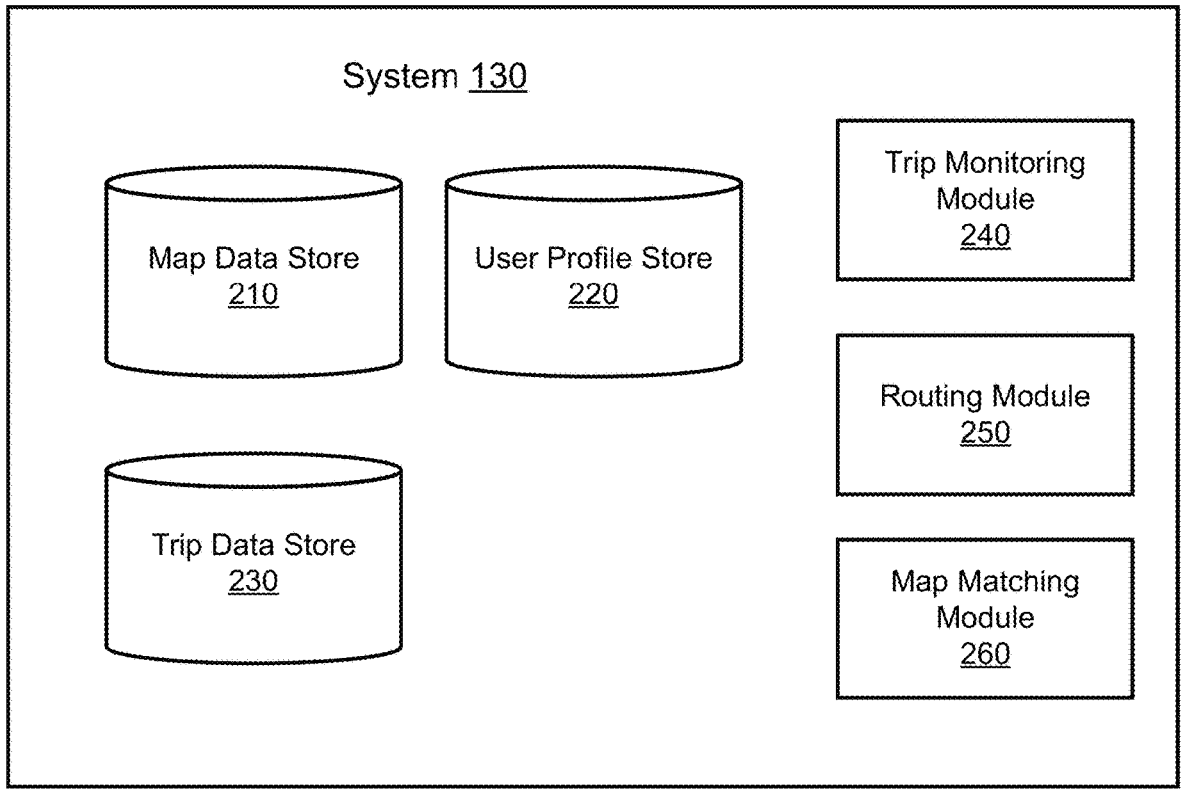
FIG. 2 is a block diagram of an architecture of the online system, in accordance with an embodiment.

FIG. 2 is a block diagram of a system architecture for the system 130, in accordance with some embodiments. The system 130 includes various modules and data stores to measure the accuracy of map matched trajectories. The system 130 comprises a map data store 210, a user profile store 220, a trip data store 230, a trip monitoring module 240, a routing module 250, and a map matching module 260. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The map data store 210 stores maps of geographic regions in which the system 130 generates routes, offers trip coordination services, and the like. The maps contain information about roads within the geographic regions. For the purposes of this disclosure, roads can include any route between two places that allows travel by foot, motor vehicle, bicycle or another form of travel. Examples of roads include streets, highways, freeways, trails, bridges, tunnels, toll roads, waterways, airways, or crossings. Roads may be restricted to certain users, or may be available for public use. Roads can connect to other roads at intersections. An intersection is a section of one or more roads that allows a user to travel from one road to another. Roads may be divided into road segments, where road segments are portions of roads that are uninterrupted by intersections with other roads. For example, a road segment would extend between two adjacent intersections on a surface street or between two adjacent entrances/exits on a highway.

The map data store 210 also includes map features, which may be stored in association with regions, road segments, and routes. Map features can include road features that describe characteristics of a map, such as placement of road signs, speed limits, road directionality (e.g., one-way, two-way), traffic history, traffic conditions, addresses on a road segment, lengths of road segments, and road segment type (e.g., surface street, residential, highway, toll). The map properties can also include features associated with intersections, such as road sign placement, the presence of traffic signals, turn restrictions, light timing information, throughput, and connecting road segments. In some embodiments, the map features also include properties describing the geographic region as a whole or portions of the geographic region, such as weather within the geographic region, geopolitical boundaries (e.g., city limits, county borders, state borders, country borders), and topological properties.

In some embodiments, the map data store 210 stores information about virtual delineations of regions (e.g., geofences). A geofence is a virtual perimeter geographically enclosing a portion of map data. Geofences are used to delineate specific geographic regions and may be applied for various reasons, such as categorization or alerts. In one embodiment, a large region is subdivided into many smaller regions using geofences, and data about map features is collected with respect to effects or presence within individual geofences. Geofences may be established along political boundaries (e.g., city borders), census tracts, neighborhood outlines, using arbitrary grid cells (e.g., an overlay of hexagons on a map), or as a group of grid cells selected based on one or more characteristics of the region corresponding to the cells.

The user profile store 220 stores information about users of the system 130 such as providers and riders. The information about users stored in the user profile store 220 may be anonymized. The user profile store 220 may store data and statistics about past trips a provider has taken, provider goals, and provider tendencies. For example, the user profile store 220 may include how long a provider has been providing trips for the system 130, provider ratings, data about past trips a provider has facilitated, an average number of trips provided per hour, vehicle type, usual hours of providing service, an average arrival time in relation to a predicted estimated time of arrival, whether the provider typically follows suggested routes, a weekly earnings goal the provider has set, geographical regions most frequently visited by the provider, an average amount of time the provider is willing to wait for a new assignment, and so forth.

Data about providers may be collected by the system 130, for example, via provider interactions with applications on a user device 100, and via rider feedback about the provider. User profile data may be used to determine a provider's probability of behaving in certain ways, for example, whether a provider is likely to follow a suggested route and whether a provider is likely to travel among different geographical regions, for example, when responding to a trip request from a rider.

The trip data store 230 stores data related to one or more past trips facilitated by the system 130. Trip data may include information about one or more of an origin and a destination of a trip, a route taken between the origin and the destination, a time of the trip, and an identification of the trip provider. The trip data may also include location information gathered by the location sensor on the user device 100 during the trip. Stored trip information can also include route features such as traffic signals and road signs, an estimated trip duration generated at the time a trip was requested, and an actual trip duration. In some embodiments, the trip data store 230 stores data related to trips taken by a provider that were not requested by a rider and that did not involve rider transport. For example, the system may suggest routes to a provider to encourage the provider to move toward an area of high demand (e.g., an area where many riders are requesting trips).

The trip monitoring module 240 receives data about trips as trips occur, which may include a provider's movement independent of transporting a rider. Trip data may include information about an origin location and destination, traffic conditions, whether the provider follows the suggested route, and feedback and incident reports submitted by riders or providers. Additionally, the trip monitoring module 240 may receive location sensor data from user devices 100 as trips occur. Location sensor data may include location coordinates, time stamps associated with the location coordinate data, and other information updated during the trip. Trip data collected by the trip monitoring module 240 is stored in the trip data store 230.

The routing module 250 receives from a user device 100 transport vehicle location and destination information associated with a current trip and generates a planned route from the current transport vehicle location to the destination. The route designates a path for the vehicle to follow to reach the destination, and may designate various road segments and transitions between road segments, such as turns, for the vehicle to execute. The routing module 250 can generate the optimized route based on a number of factors, including time of day, known traffic, closed roads or ongoing construction, intermediate destinations, and others. In one embodiment, the routing module 250 updates the planned route using the updated map matched location of the vehicle. As the vehicle travels, the vehicle reports its location with respect to the location sensor on the vehicle. The location may be matched to a road segment as a map matched location by the map matching module 260 as discussed below. The routing module 250 may generate an updated planned route based on the map matched location, thereby updating the route sent to the user device 100 to represents the current location of the transport vehicle and the path to the destination from the current location.

The map matching module 260 receives location sensor data associated with current or completed trips and identifies a map matched trajectory based on the location sensor data and the planned route created by the routing module 250. The location sensor data received by the map matching module 260 is data collected by the transport vehicle. For example, the map matching module 260 may receive GPS data collected during a trip. The map matched trajectory, or map matched route, represents a trajectory taken by the transport vehicle based on the location sensor data and map data stored in the map data store 210. The trajectory may be probabilistic, and represent the most-likely trajectory consistent with the location data associated with a trip. The map matching module 260 identifies candidate road segments corresponding to each received location data point and applies an algorithm to determine the probability of each candidate road segment being the actual vehicle location. In one embodiment, the algorithm used by the map matching module 260 is a Viterbi algorithm executed on a Hidden Markov Model (HMM). In other embodiments, different or multiple algorithms may be used to identify a map matched route. In one embodiment, the map matching module 260 transmits the map matched route to the trip data store 210 to be stored in association with the trip.

Figure 3:
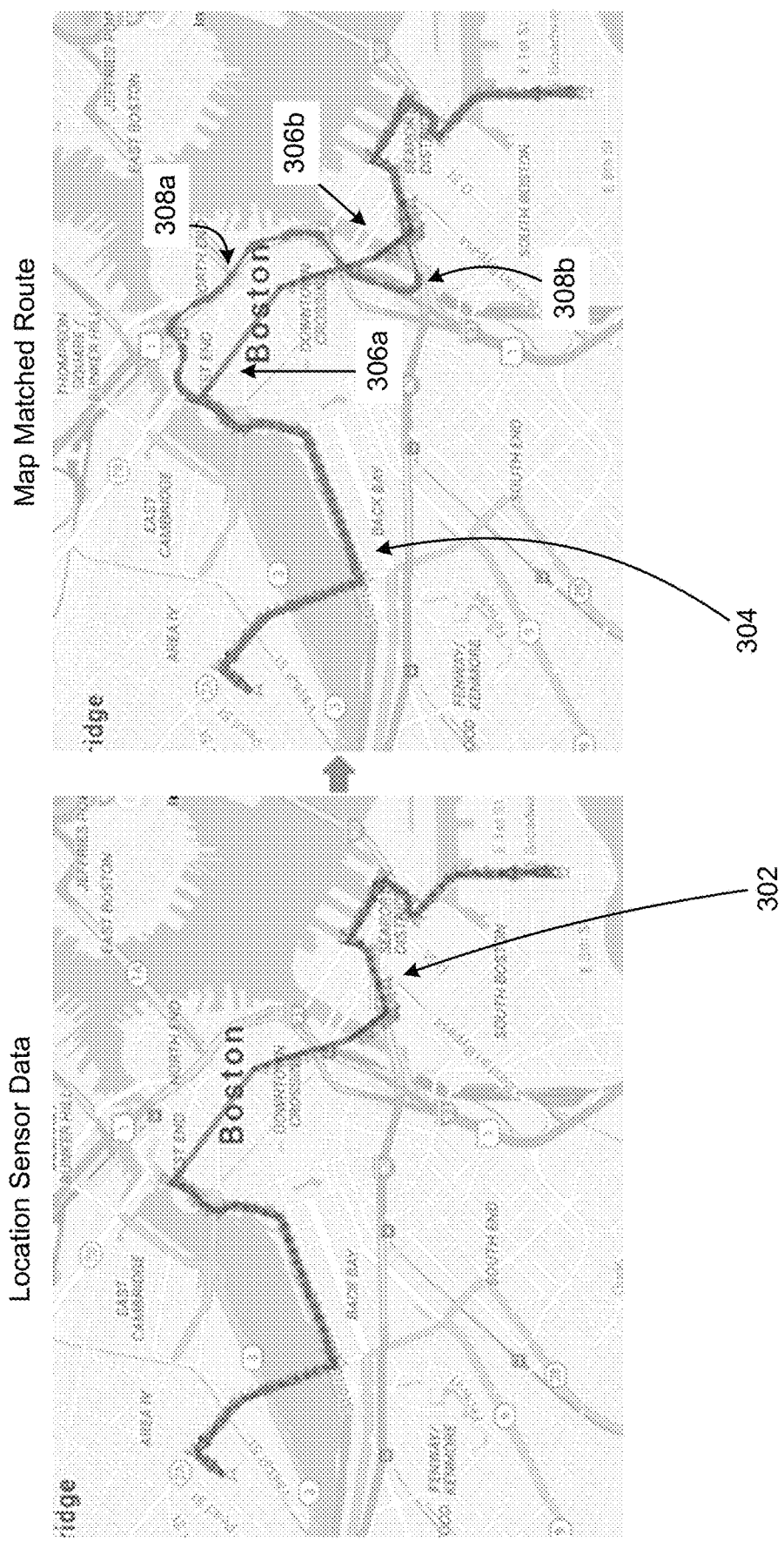
FIG. 3 is an example illustrating location data received on a trip and the corresponding map matched trajectory, in accordance with an embodiment.

FIG. 3 is an example illustrating location data received on a trip and the corresponding map matched trajectory. When the system receives location data associated with a trip, it uses the Viterbi algorithm to determine a map matched trajectory from the raw location data. The location sensor data received by the system 302 may contain errors due to interference from buildings, vehicles, weathers, and other circumstances which affect the precision of the location signals. This may result in a corresponding path that incorrectly identifies the road segments actually traveled by the transport vehicle, and thus impacts the transit information associated with the trip, such as the on-route distance of the trip or identifying the location of the vehicle for routing purposes. The system applies a Viterbi algorithm to determine the most likely map matched route. The predicted route represents the likely path actually traversed by the transport vehicle. FIG. 3 illustrates the predicted map matched route overlaid to the location sensor data 302. The map matched route can align closely to the location sensor data, as shown in segment 304. In other areas, the forward probability algorithm may show a significant deviation between the map matched results 308*a*, 308*b* and the location sensor data 306*a*, 306*b*, based on map data associated with the area.

Figure 4:
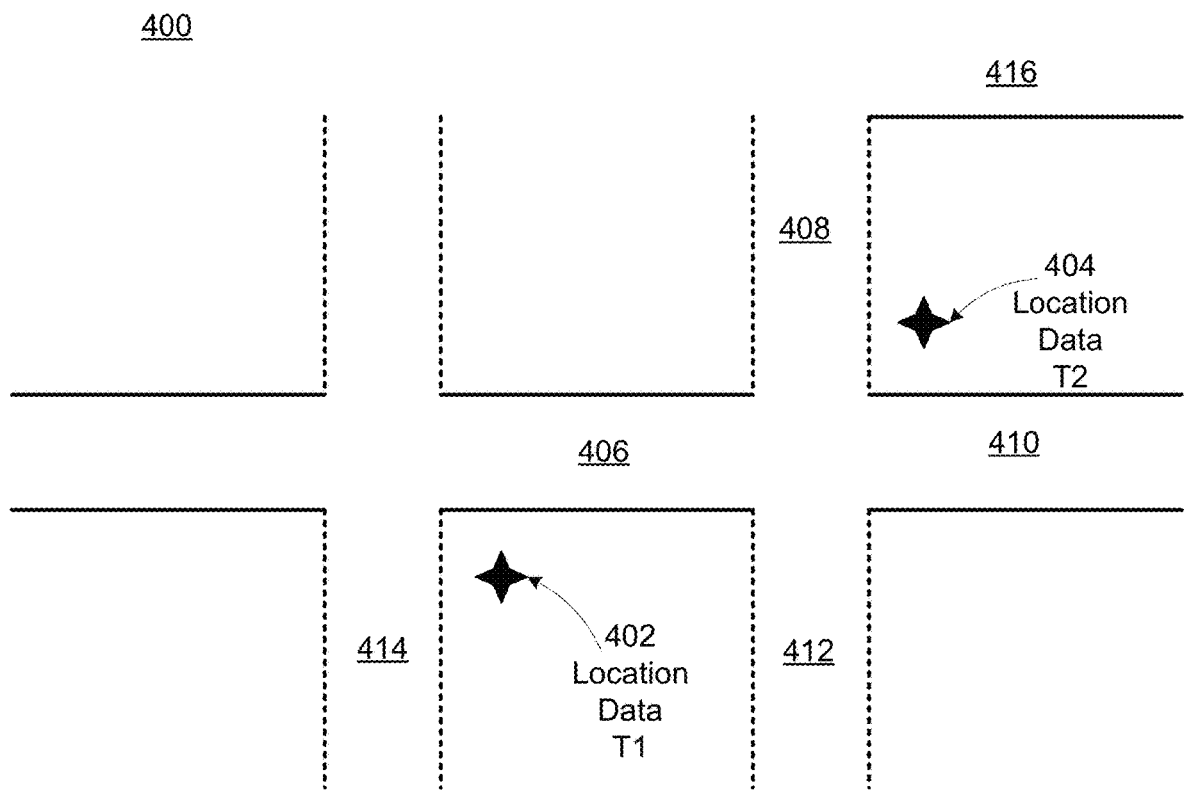
FIG. 4 is an example illustrating location data points and possible corresponding road segments on a map, in accordance with an embodiment.

FIG. 4 is an example illustrating location data points received by the system 130 from a transport vehicle on a trip and corresponding candidate road segments on a map. The map matching module 260 receives location data 402 and 404 associated with points in time on a trip and applies a Viterbi algorithm to determine road segments on a map 400 to which they might correspond. Because the location sensor introduces some error due to interference, calibration, or other factors, the location sensor coordinates typically do not correspond exactly to a road segment. Thus, the Viterbi algorithm may be used to consider road segments in an area, radius, or other region that do not correspond directly to the location data but may correspond to the actual location of the vehicle generating that location data. For example, the location data 402, 404 shown in FIG. 4 do not lie on road segments described by the underlying map. Therefore, for each location data point, the map matching module 260 identifies nearby road segments as candidates from which the location data point may have been generated. The first location data point 402 may correspond to road segments 406, 412, or 414. The second location data point 404 may correspond to road segments 408, 410, and 416. The system identifies up to a threshold number of possible road segments, based on the underlying map data, and may include the nearest N road segments, up to a maximum distance from the location data coordinate. To determine the probability that each road segment is the most likely trajectory of the transport vehicle, the Hidden Markov Model is used to determine an emission probability and a transition probability associated with each road segment or set of road segments.

Figure 5:
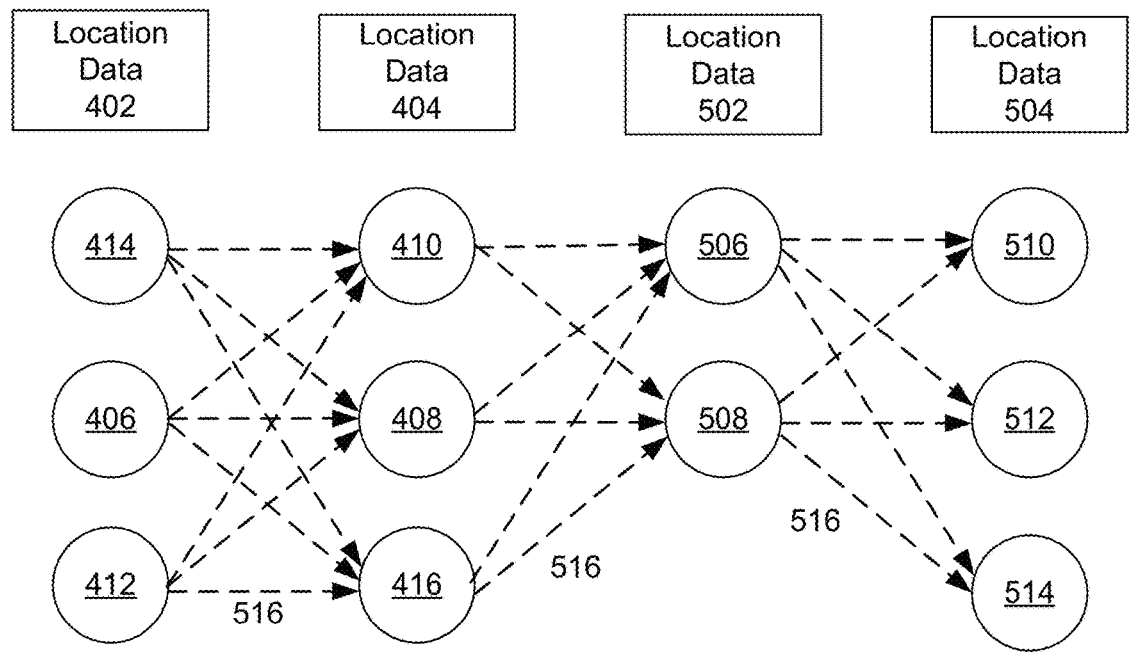
FIG. 5 is an example illustrating possible transitions between candidate road segments to calculate a transition probability, in accordance with an embodiment.

FIG. 5 is an example illustrating possible transitions between candidate road segments to calculate a transition probability. The transition probability is determined based on the probability that, for a given pair of candidate road segments, the transport vehicle will move from the first candidate road segment to the next. This is calculated under the conditions that the transport vehicle cannot defy physics or break traffic laws. The transition probability is modeled by the difference between the haversine distance of the location data and the routing distance corresponding to the map data. A routing distance is determined as the distance from a first candidate road segment to a second candidate road segment based on the path a transport vehicle would traverse. A transition between two candidate road segments that have a similar haversine distance as the routing distance is associated with a higher probability of being the true trajectory of the transport vehicle. The transition probability is adjusted based on whether a given pair of candidate road segments corresponds to the planned route generated for the trip.

As shown in FIG. 5, transition probabilities 516 are calculated for each possible path between candidate road segments. As in FIG. 4, each location data point is associated with a set of candidate road segments. Candidate road segments associated with location data with consecutive time stamps represent possible transitions between the candidate road segments during the time between readings of the location data from the location sensor. For example, the candidate road segment 414 corresponds to the location data point 402. A possible transition may occur from the road segment 414 to each of the candidate road segments corresponding to the next location data point 404. Therefore, a transition probability is calculated between road segments 414 and 410, 414 and 408, and 414 and 416.

$$P(x_{i,j} | x_{i-1,k}) = \frac{1}{\beta} e^{\frac{-d_i}{\beta}} \quad \text{Equation 1}$$

$$d_i = |\|z_i - z_{i-1}\|_{haversinedist} - \|x_{i,j} - x_{i-1,k*}\|_{route}|$$

As one example shown in Equation 1, the transition probability $P(x_{i,j}|x_{i-1,k})$ may be computed as a function of the absolute value of the difference between the haversine distance of the location data and the routing distance. The routing distance measures the shortest distance between two candidate road segments as traversed by a vehicle. Therefore, the routing distance is calculated according to existent roads, traffic laws, and other obstacles. The distance between the first location data point $z_{i-1}$ and the second location data point $z_i$ is compared to the routing distance between the first candidate road segment $x_{i-1,k*}$ and the second candidate road segment $x_{i,j}$. Thus, a relatively lower difference between the haversine distance of the location data and the routing distance reflects that the routing path along a possible route transition more closely aligns with the distance reflected in the location data, and is therefore more likely to accurately represent the transition taken by the transport vehicle. This distance $d_i$ is modified by a constant $\beta$, which can represent and be adjusted to account for the system tolerance to non-direct routes. A larger value of $\beta$ permits a greater tolerance to larger differences between the haversine distance and the routing distance, while a smaller value of $\beta$ reflects a lower tolerance to differences between the haversine and routing distances. In one embodiment, $\beta$ is 1. The modified value is then converted using an exponential function to the transition probability $P(x_{i,j}|x_{i-1,k})$.

In one embodiment, the transition probability is used in conjunction with an emission probability to determine a map matched trajectory. The emission probability represents a likelihood that the transport service vehicle is at a candidate road segment given an observation of the location data at a candidate road. Additional information regarding the calculation of an emission probability is disclosed in U.S. Provisional Application No. 62/612,190, filed Dec. 29, 2017, which is hereby incorporated by reference.

Figure 6:
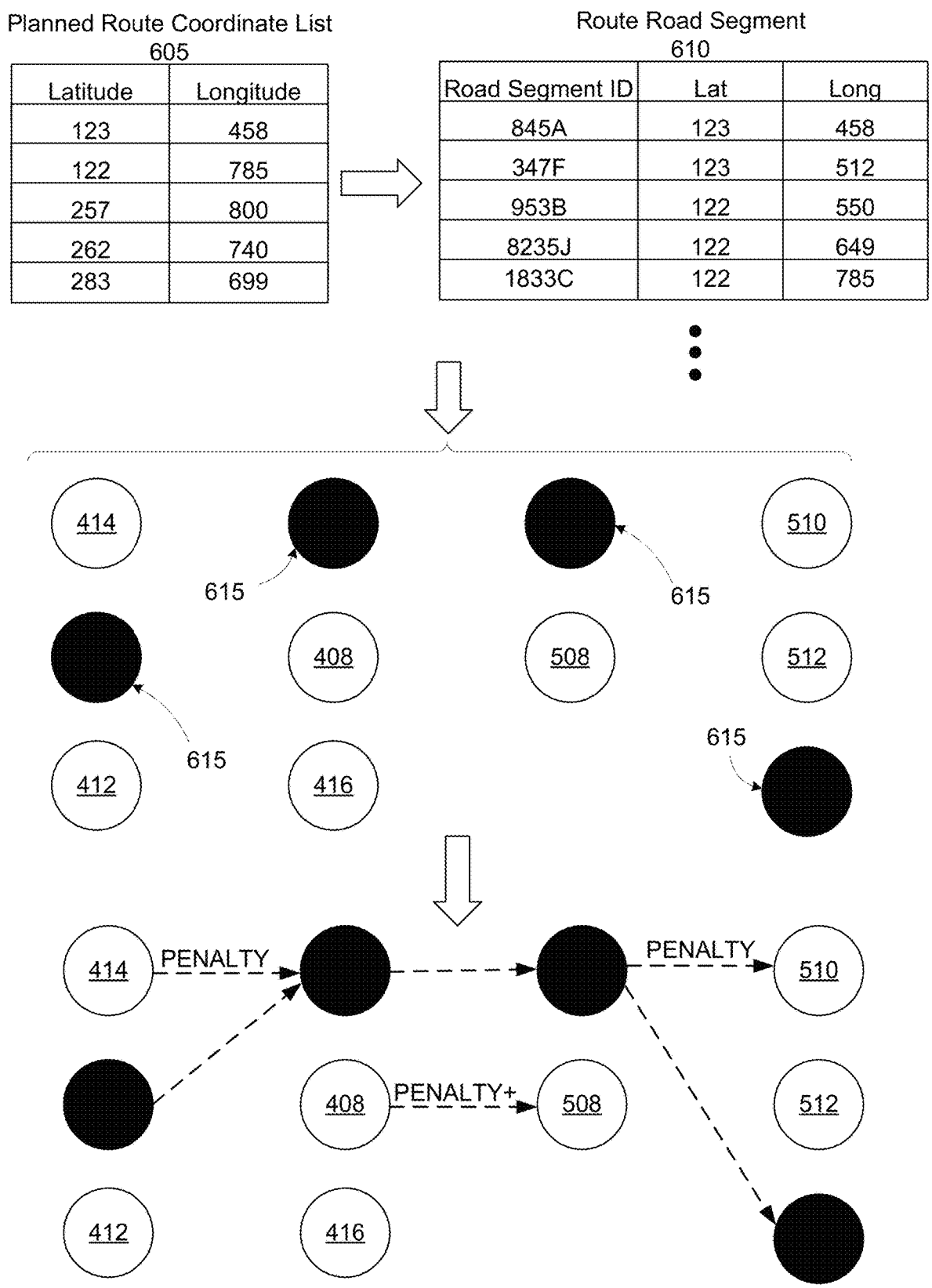
FIG. 6 is an example illustrating penalizing transition probabilities based on a planned route, in accordance with an embodiment.

FIG. 6 is an example illustrating adjusting transition probability calculations based on planned route information. In some embodiments, planned route information is received as a compressed set of latitude and longitude pairs ("lat-long pairs") 605 and must be decoded to determine a corresponding set of route road segments 610. In this embodiment, the route information may be transmitted as lat-long pairs such that various systems can match the latitude and longitude to mapping, intersection, and road segment data that may differ across systems and mapping data providers, for example between the system generating the route and the mapping data stored in map data store 210. In one embodiment, the set of lat-long pairs are represented by a polyline that connects the sequence of lat-long pairs. To convert the polyline of lat-long pairs to road segments for the planned route represented in the lat-long pairs, the transport service system 130 accesses the map data store 210 to retrieve a copy of map data and searches the map data based on the polyline to identify corresponding intersections and road segments.

As one example embodiment, the lat-long pairs are used to identify matching intersections in the map data store 210 and identify road segments between the intersections using the heading, or direction, of the polyline. The transport service system 130 identifies an intersection in the map data that most closely aligns with the first lat-long pair in the polyline. From the first intersection and the first lat-long pair, the transport service system 130 moves in lockstep through the polyline and the map data to identify road segments and intersections corresponding to the polyline. In this example, the process proceeds from an intersection (in the map) corresponding to a polyline lat-long pair to identify a subsequent intersection matching a subsequent lat-long pair. Since the lat-long pairs may not correspond to intersections of the map data (and the map data may include more than one intersection for each lat-long pair), there may be one or more lat-long pair or one or more intersections/road segments in the map data in between each intersection that matches a lat-long pair.

To traverse the polyline and lat-long pair in parallel, the transport service system 130 calculates a polyline heading from the current lat-long pair to the next lat-long pair. From the corresponding intersection, the transport service system 130 identifies a road segment with a heading within a threshold similarity to the polyline heading. Next, the system 130 advances to the next polyline point and along the road segment to an intersection reached after that road segment. The system 130 may determine a match by comparing the coordinates of the polyline point to the coordinates of the intersection. When there is not a match, the map data and polyline are traversed in parallel by determining the distance traveled along the polyline and along the road segments since the last matching intersection and lat-long pair. When the polyline has a shorter distance traveled, the system 130 advances to the next polyline point. When the distance traveled along the road segment is shorter, the system 130 repeats the heading-based analysis to determine the heading of the next polyline point from that position and the heading of the road segments leaving that intersection. The road segment with a heading similar to (e.g., most similar or within a threshold similarity) the polyline heading is selected as the next road segment to traverse. The road segments and lat-long pairs in the polyline are thus traversed in parallel to identify matching points. When an intersection is reached that does not have a road segment exiting the intersection with a heading within a threshold of the polyline heading, the system 130 may identify this path as inconsistent with the polyline and re-start at an earlier portion of the matching route. The process repeats until every point in the polyline has a corresponding road segment associated with it. The identified road segments are used by the transport service system 130 to represent the planned route for the corresponding trip. In one example shown in FIG. 6, the corresponding set of route road segments are represented using road segment IDs identified from the map data of the geographic area.

Based on the identified road segments, the transport service system 130 determines candidate road segments corresponding to the planned route. The determined candidate road segments 615 are considered by the transport service system 130 as more likely to be traversed during the trip than candidate road segments that do not correspond to the planned route. As shown in FIG. 6, the transport service system 130 identifies candidate road segments 406, 410, 506, and 514 as corresponding to the planned route information.

The transition probability $P(x_{i,j}|x_{i-1,k})$ calculated in FIG. 5 is adjusted based on whether the pair of candidate road segments corresponds to the planned route generated for the trip. The adjustment reflects that it is more likely that the transport vehicle traverses the candidate road segments corresponding to the planned route than the candidate road segments that do not. In one embodiment, the adjustment is a penalty applied to pairs of candidate road segments that do not correspond to the planned route. The penalty increases the distance $d_i$ used in the calculation for the transition probability.

$$d_{i,penalty} = |||z_i - z_{i-1}||_{haversinedist} - ||x_{i,j} - x_{i-1,k*}||_{route}| + c \qquad \text{Equation 2}$$

As one example shown in Equation 2, the penalty increases the distance $d_i$ used in the calculation for the transition probability. As described in conjunction with Equation 1, the distance $d_i$ is computed from the absolute value of the difference between the haversine distance of the location data $||z_i - z_{i-1}||_{haversinedist}$ and the routing distance of the corresponding candidate road segments $||x_{i,j} - x_{i-1,k*}||_{route}$. A penalty constant c is applied to produce a penalized distance $d_{i,penalty}$. The increased distance $d_{i,penalty}$ is then used to determine a transition probability as shown in Equation 1, resulting in a decreased transition probability $P(x_{i,j}|x_{i-1,k})$. In one embodiment, the penalty is greater for a pair of candidate road segments in which neither of the candidate road segments correspond to the planned route than for a pair of candidate road segments in which one of the candidate road segments corresponds to the planned route. For example, as shown in FIG. 6, a greater penalty is applied to the pair of candidate road segments 408 to 508, where neither of the candidate road segments are identified as corresponding to the planned route. In comparison, a lesser penalty is applied to the pairs of candidate road segments 414 to 410 and 506 to 510, where one candidate road segment of the pair of candidate road segments is identified as corresponding to the planned route, and no penalty is applied to the pairs of candidate road segments 406 to 410 and 406 to 514, where both candidate road segments of the pair of candidate road segments is identified as corresponding to the planned route. In another embodiment, the penalty is fixed for pairs of candidate road segments in which at least one candidate road segment does not correspond to the planned route.

In another embodiment, the adjustment is a boost applied to pairs of candidate road segments that correspond to the planned route. The boost decreases the distance $d_i$ used in the calculation for the transition probability. The decreased distance $d_i$ results in an increased transition probability $P(x_{i,j}|x_{i-1,k})$. The boost is greater for a pair of candidate road segments in which both candidate road segments correspond to the planned route than for a pair of candidate road segments in which only one candidate road segment corresponds to the planned route.

Figure 7:
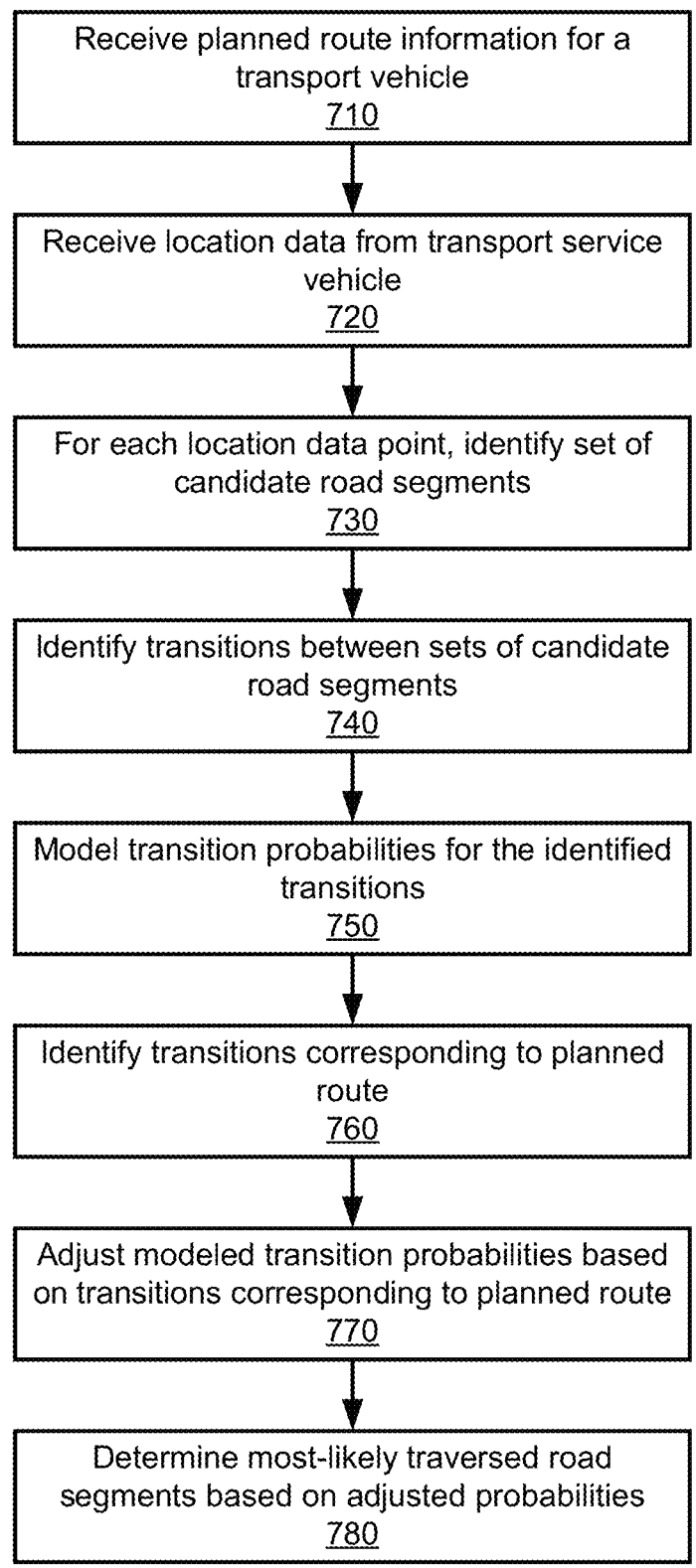
FIG. 7 is a flow diagram of a method for biasing transition probabilities in a map matching process based on a planned route, in accordance with an embodiment.

FIG. 7 is a flow diagram of a method for biasing a map matched trajectory based on planned route information. In various embodiments, the method may include different and/or additional steps than those described in conjunction with FIG. 7.

A transport service system 130 receives 710 planned route for a transport vehicle. The planned route is associated with a particular trip and timestamp, and describes a path from the current location of the transport vehicle to a destination location. In one embodiment, the planned route is provided as a compressed set of latitude and longitude pairs. The compressed set of latitude and longitude pairs are decoded by the transport service system 130 for use in determining a map matched trajectory.

The transport service system 130 receives 720 location data from the transport service vehicle. The location data is associated with the trip and a timestamp. For each location data point, the transport service system 130 identifies 730 a set of candidate road segments. The transport service system 130 identifies 740 a transition for each pair of candidate road segments corresponding to sequential pairs of location data points and models 750 transition probabilities for the identified transitions. The transport service system 130 identifies 760 the transitions corresponding to the planned route received for the transport vehicle and adjusts 770 the modeled transition probabilities based on whether the transitions between pairs of candidate road segments correspond to the planned route. In one embodiment, the adjustment is a penalty applied to transition probabilities of pairs of candidate road segments in which one or more of the candidate road segments do not correspond to the planned route. In another embodiment, the adjustment is a boost applied to transition probabilities of pairs of candidate road segments in which one or more of the candidate road segments correspond to the planned route. Based on the adjusted transition probabilities, the transport service system 130 determines 780 the most-likely traversed road segments to identify a map matched trajectory for the transport vehicle.

In cases where the map matched trajectory is identified for a trip that is in progress, the map matched trajectory is used to determine when an updated planned route should be identified for the trip. For example, if the transport service system 130 identifies a map matched trajectory for the trip that deviates from the planned route, indicating that the transport vehicle has left the planned route, the system identifies an updated planned route for the transport vehicle using the current location information.

Figure 8:
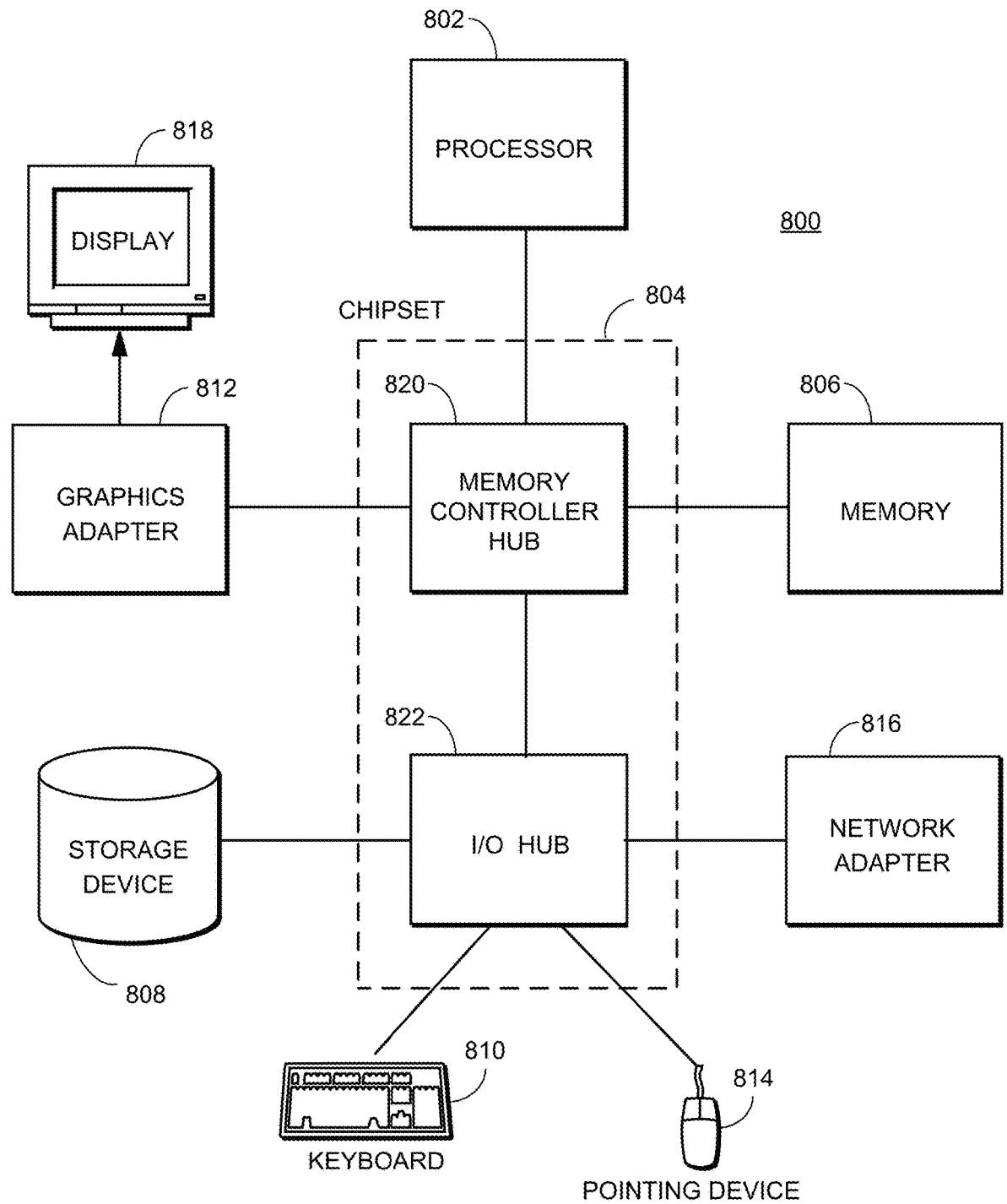
FIG. 8 is a high-level block diagram illustrating physical components of a computer used as part or all of one or more of the entities described herein in one embodiment.

FIG. 8 is a high-level block diagram illustrating physical components of a computer 800 used as part or all of one or more of the computing systems described herein in one embodiment. For example, instances of the illustrated computer/800 may be used as a server operating the system 130. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O hub 822. In another embodiment, the memory 806 is coupled directly to the processor 802 instead of the chipset 804. In one embodiment, one or more sound devices (e.g., a loudspeaker, audio driver, etc.) is coupled to chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer 800. The graphics adapter 812 displays images and other information on the display 818. The network adapter 816 couples the computer system 800 to a local or wide area network.

As is known in the art, a computer 800 can have different and/or other components than those shown in FIG. 8. In addition, the computer 800 can lack certain illustrated components. In one embodiment, a computer 800 acting as a server may lack a keyboard 810, pointing device 814, graphics adapter 812, and/or display 818. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving a planned route from a transport service system, the planned route associated with a trip traveled by a transport service vehicle;
    receiving a time series of two or more location data points captured by location sensors on the transport service vehicle;
    for each location data point in the time series, identifying a sets of candidate road segments of the transport service vehicle, the candidate road segments representing possible road segments traveled by the transport service vehicle when capturing the location data point;
    for each sequential pair of location data points in the time series:
        identifying transitions between the sets of candidate road segments associated with the location data points in the sequential pair and in the sequential sets of candidate road segments;
        modeling transition probabilities for the identified transitions between the candidate road segments in the sequential sets of candidate road segments;
        identifying transitions that correspond to the planned route associated with the trip;
        adjusting the transition probabilities by either reducing transition probabilities that do not correspond to the identified transitions or increasing transition probabilities for transitions that correspond to the identified transitions; and
    determining most-likely traversed road segments based on the adjusted transition probabilities.

2. The method of claim 1, wherein the transition probability for an identified transition is modeled by the difference between the haversine distance between the corresponding sequential pair of location data points and a routing distance between the corresponding sequential set of candidate road segments.

3. The method of claim 2, wherein the transition probability is adjusted for candidate road segments that do not correspond to the planned route by applying a penalty to the difference between the haversine distance between the corresponding sequential pairs of location data points and a routing distance between the corresponding sequential set of candidate road segments.

4. The method of claim 1, wherein the transition probability is calculated using a Hidden Markov Model.

5. The method of claim 1, further comprising calculating an emission probability, the emission probability based on the likelihood that the transport service vehicle is at a candidate road segment given an observation of the location data at a candidate road.

6. The method of claim 5, further comprising determining, based at least in part on the emission probability and the adjusted transition probability, a most likely path taken by the transport service vehicle.

7. The method of claim 1, wherein the transition probability is calculated for a subset of the sequential pairs of location data points in the time series.

8. The method of claim 1, wherein receiving a planned route from a transport service system further comprises:
   receiving a set of latitude and longitude pairs from the transport service system, the latitude and longitude pairs representing coordinates along a planned route;
   converting the set of latitude and longitude pairs to a polyline, the polyline including points representing the latitude and longitude pairs; and
   identifying road segments and intersections corresponding to polyline based on headings and distances between the points on the polyline.

9. A non-transitory computer-readable storage medium storing computer program instructions executable by a processor to perform operations comprising:
   receiving a planned route from a transport service system, the planned route associated with a trip traveled by a transport service vehicle;
   receiving a time series of two or more location data points captured by location sensors on the transport service vehicle;
   for each location data point in the time series, identifying a sets of candidate road segments of the transport service vehicle, the candidate road segments representing possible road segments traveled by the transport service vehicle when capturing the location data point;
   for each sequential pair of location data points in the time series:
      identifying transitions between the sets of candidate road segments associated with the location data points in the sequential pair and in the sequential sets of candidate road segments;
      modeling transition probabilities for the identified transitions between the candidate road segments in the sequential sets of candidate road segments;
      identifying transitions that correspond to the planned route associated with the trip;
      adjusting the transition probabilities by either reducing transition probabilities that do not correspond to the identified transitions or increasing transition probabilities for transitions that correspond to the identified transitions; and
   determining most-likely traversed road segments based on the adjusted transition probabilities.

10. The non-transitory computer-readable storage medium of claim 9, wherein the transition probability for an identified transition is modeled by the difference between the haversine distance between the corresponding sequential pair of location data points and a routing distance between the corresponding sequential set of candidate road segments.

11. The non-transitory computer-readable storage medium of claim 10, wherein the transition probability is adjusted for candidate road segments that do not correspond to the planned route by applying a penalty to the difference between the haversine distance between the corresponding sequential pairs of location data points and a routing distance between the corresponding sequential set of candidate road segments.

12. The non-transitory computer-readable storage medium of claim 9, wherein the transition probability is calculated using a Hidden Markov Model.

13. The non-transitory computer-readable storage medium of claim 9, further comprising calculating an emission probability, the emission probability based on the likelihood that the transport service vehicle is at a candidate road segment given an observation of the location data at a candidate road.

14. The non-transitory computer-readable storage medium of claim 13, further comprising determining, based at least in part on the emission probability and the adjusted transition probability, a most likely path taken by the transport service vehicle.

15. The non-transitory computer-readable storage medium of claim 9, wherein the transition probability is calculated for a subset of the sequential pairs of location data points in the time series.

16. The non-transitory computer-readable storage medium of claim 9, wherein receiving a planned route from a transport service system further comprises: receiving a set of latitude and longitude pairs from the transport service system, the latitude and longitude pairs representing coordinates along a planned route; converting the set of latitude and longitude pairs to a polyline, the polyline including points representing the latitude and longitude pairs; and identifying road segments and intersections corresponding to polyline based on headings and distances between the points on the polyline.

17. A system comprising:
   a computer processor for executing computer program instructions; and
   a non-transitory computer-readable storage medium storing computer program instructions executable by the processor to perform operations comprising:
      receiving a planned route from a transport service system, the planned route associated with a trip traveled by a transport service vehicle;
      receiving a time series of two or more location data points captured by location sensors on the transport service vehicle;
      for each location data point in the time series, identifying a sets of candidate road segments of the transport service vehicle, the candidate road segments representing possible road segments traveled by the transport service vehicle when capturing the location data point;

for each sequential pair of location data points in the time series:
- identifying transitions between the sets of candidate road segments associated with the location data points in the sequential pair and in the sequential sets of candidate road segments;
- modeling transition probabilities for the identified transitions between the candidate road segments in the sequential sets of candidate road segments;
- identifying transitions that correspond to the planned route associated with the trip;
- adjusting the transition probabilities by either reducing transition probabilities that do not correspond to the identified transitions or increasing transition probabilities for transitions that correspond to the identified transitions; and determining most-likely traversed road segments based on the adjusted transition probabilities.

18. The system of claim 17, wherein the transition probability for an identified transition is modeled by the difference between the haversine distance between the corresponding sequential pair of location data points and a routing distance between the corresponding sequential set of candidate road segments.

19. The system of claim 18, wherein the transition probability is adjusted for candidate road segments that do not correspond to the planned route by applying a penalty to the difference between the haversine distance between the corresponding sequential pairs of location data points and a routing distance between the corresponding sequential set of candidate road segments.

20. The system of claim 17, wherein the transition probability is calculated using a Hidden Markov Model.

* * * * *

UNITED STATES PATENT AND TRADEMARK OFFICE
CERTIFICATE OF CORRECTION

PATENT NO. : 10,533,862 B1
APPLICATION NO. : 16/203600
DATED : January 14, 2020
INVENTOR(S) : Paranjpe et al.

Page 1 of 1

It is certified that error appears in the above-identified patent and that said Letters Patent is hereby corrected as shown below:

In the Claims

Column 12, Claim 1, Line 46: "identifying a sets of candidate road segments" to read as -- identifying sets of candidate road segments --

Column 13, Claim 9, Line 51: "identifying a sets of candidate road segments" to read as -- identifying sets of candidate road segments --

Column 14, Claim 17, Line 63: "identifying a sets of candidate road segments" to read as -- identifying sets of candidate road segments --

Signed and Sealed this
Third Day of November, 2020

Andrei Iancu
*Director of the United States Patent and Trademark Office*